J. J. & J. F. CERNEY.
HAND TRUCK.
APPLICATION FILED MAR. 9, 1914.
1,102,872.
Patented July 7, 1914.
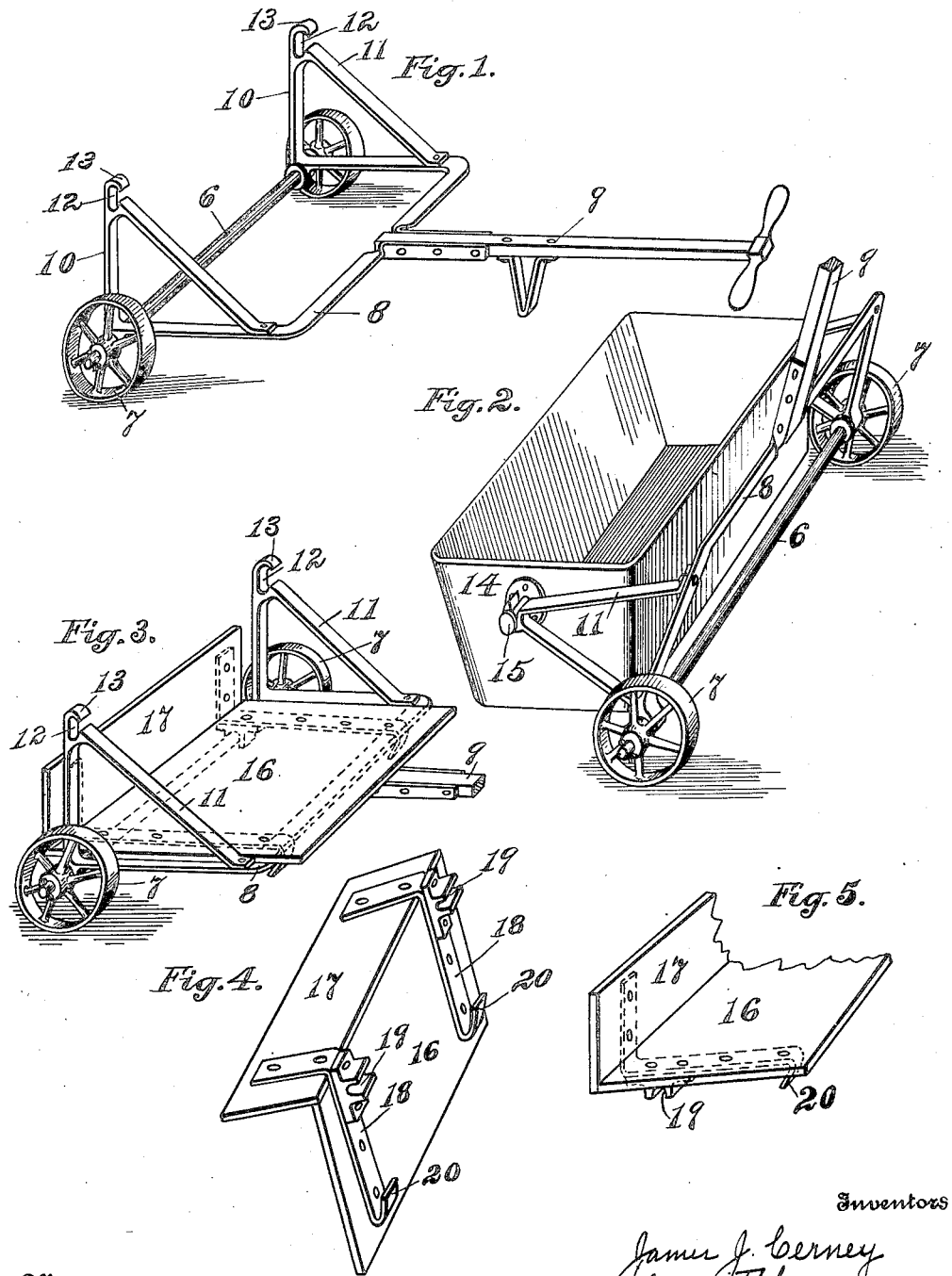

UNITED STATES PATENT OFFICE.

JAMES J. CERNEY AND JOSEPH F. CERNEY, OF CLEVELAND, OHIO.

HAND-TRUCK.

1,102,872.  Specification of Letters Patent.  Patented July 7, 1914.

Application filed March 9, 1914. Serial No. 823,341.

*To all whom it may concern:*

Be it known that we, JAMES J. CERNEY and JOSEPH F. CERNEY, citizens of the United States, residing at Cleveland, in the county of Cuyahoga and State of Ohio, have invented certain new and useful Improvements in Hand-Trucks, of which the following is a specification.

This invention relates to improvements in trucks, and especially to improvements in hand trucks capable of a variety of uses, such as for transporting boxes, packages and goods of various kinds. It is adapted to engage and lift a box for transportation, said box being provided with trunnions supported in brackets forming a part of the truck. The device is also provided with a removable platform, which, when used, is supported on the frame of the truck and will serve to carry any material placed thereon.

The invention is illustrated in the accompanying drawings in which:—

Figure 1 is a perspective view of the truck frame. Fig. 2 is a perspective view showing a metal box lifted and carried by the truck. Fig. 3 is a perspective view of the truck with the removable platform applied thereto. Fig. 4 is a perspective view of the underside of the platform. Fig. 5 is a detail in section of the platform.

Referring specifically to the drawings, 6 indicates the truck axle, mounted at its ends upon wheels 7. This axle carries a frame consisting of a yoke 8 joined to a handle 9, the yoke having bearings adjacent the wheels, through which the axle extends. Brackets are mounted upon the yoke members, said brackets consisting of uprights 10 and braces 11; the uprights being provided at the top with recesses 12 within the end hooks 13..

In Fig. 2 a box 14 is shown, conveniently made of metal, and provided at its ends with trunnions 15 which may be engaged in the recesses 12 in order to lift and carry the box. The box will be found particularly useful for carrying liquid matter.

In Fig. 3 the truck frame is shown provided with a platform consisting of a bottom board 16 and an end board 17, these boards being attached to angular irons 18 on the underside. Each of said irons has a pair of lugs 19 with a bearing recess between adapted to fit over the axle 6 when the platform is placed on the frame between the side brackets. Each iron 18 has at its upper or rear end a hook 20 which will engage the cross bars of the yoke members 8. By this means the platform is held in place on the frame, and the uprights 10, and members 11, serve as side pieces or guards to confine packages or material on the platform and prevent the same slipping off sidewise.

The device is capable of a variety of uses, as above explained, and the platform can be easily removed or replaced as occasion demands.

What we claim as new is:—

1. A truck having an axle, a yoke frame connected thereto, a removable platform having bottom and end boards, and angular irons to which said boards are secured, said irons having depending lugs between which the axle fits and hooks engaging the frame.

2. A truck having a frame provided with uprights at its sides having recesses adapted to engage trunnions on the ends of a box, and a removable platform fitting between the uprights and having devices on its underside to engage the frame.

In testimony whereof, we do affix our signatures in presence of two witnesses.

JAMES J. CERNEY.
JOSEPH F. CERNEY.

Witnesses:
STEDMAN J. ROCKWELL,
JOHN A. BOMMHARDT.